J. W. DAILEY.
HANDLE.
APPLICATION FILED MAY 13, 1911.
1,021,575.
Patented Mar. 26, 1912.
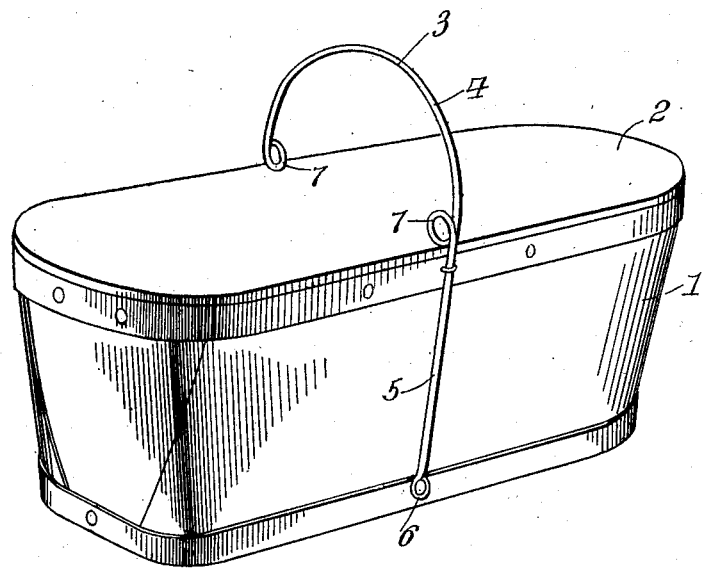
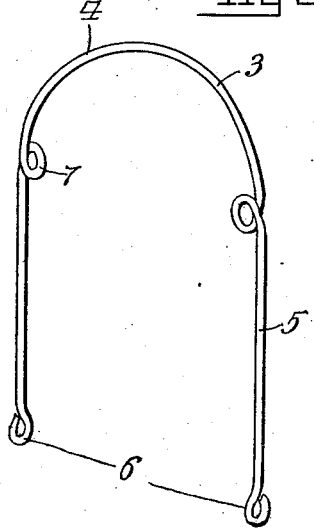 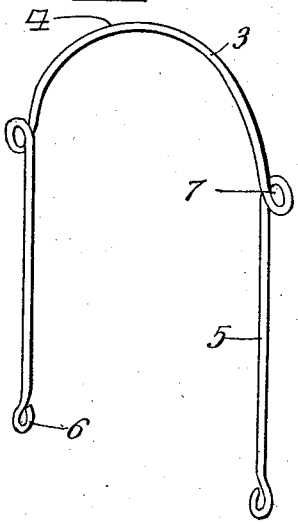
Inventor
Jacob W. Dailey
Witnesses
M. H. Slifer.
Wm. J. Foord.
By Victor J. Evans
Attorney

UNITED STATES PATENT OFFICE.

JACOB W. DAILEY, OF FORESTVILLE, NEW YORK.

HANDLE.

1,021,575.    Specification of Letters Patent.    Patented Mar. 26, 1912.

Application filed May 13, 1911. Serial No. 626,937.

*To all whom it may concern:*

Be it known that I, JACOB W. DAILEY, a citizen of the United States, residing at Forestville, in the county of Chautauqua and State of New York, have invented new and useful Improvements in Handles, of which the following is a specification.

This invention relates to handles, primarily intended for use in connection with fruit baskets, but of course susceptible to other uses and the primary object of the invention is to provide a handle constructed of a single piece of resilient material forming a substantially U-shaped bail and having its side arms provided with loops or offsets, the latter adapted to contact with the top or closure to sustain the same upon the basket and at the same time permitting of the removal of the closure when desired.

With the above objects in view, and others which will appear as the nature of the invention progresses, the improvement resides in the novel construction of handles hereinafter fully described and claimed.

In the drawings,—Figure 1 is a perspective view of a fruit basket provided with the improved handle. Fig. 2 is a perspective view of the handle when detached. Fig. 3 is a similar view showing a slightly modified form of the handle.

In the drawings, the numeral 1 designates a fruit basket of the ordinary construction. This basket 1 is provided with a removable top or closure 2, and secured to the sides of the basket and approximately the central portions thereof is my improved handle 3. This handle 3 is constructed of a single strand of resilient material, comprising an upper or bail portion 4 having side arms 5. The extremity of the side arms 5 are formed with eyes 6, the latter adapted to receive one of the nails which secures the bottom to the body of the basket. The said side arms 5 are each bent upon themselves to provide loops 7, which are arranged at right angles to the eyes and these loops are adapted to overlie the top or closure 2 of the basket.

From the above description, taken in connection with the accompanying drawings, the simplicity of the device, as well as the advantages thereof, will, it is thought, be perfectly apparent to those skilled in the art to which such inventions appertain.

It is to be understood that the side arms of the handle 3 exert a pressure toward each other and that the loops 7 overlie and snugly engage with the top or closure 2. The cover may be removed by pressing on the top of the handle which springs the basket sides and the handle outwardly and removes the loops from the cover and it may be replaced in the same manner by pressing the cover on the top of the loops and repeating the same action.

In Fig. 3 I have shown a slightly modified form of the handle. The handle in this instance is substantially similar to that heretofore described, but the loops 7 are turned upwardly instead of inwardly, the said loops in this instance adapted to receive a sustaining cord.

Having thus fully described the said invention, what I claim is:—

In combination with a basket having a cover, of a resilient handle connected with the basket, said handle comprising a U-shaped bail having its side arms bent upon each other to provide parallel loops projecting inwardly in direct line with said bail, said loops engaging the said cover firmly holding the same in place, and adapted to be disengaged from the cover by downward pressure on the bail, eyes formed on the free ends of the bail and secured to the lowermost points on the sides of the basket, and means for holding the bail permanently in vertical position.

In testimony whereof I affix my signature in presence of two witnesses.

JACOB W. DAILEY.

Witnesses:
J. C. HUTCHINSON,
RAY FISHER.